(12) United States Patent
Chappert et al.

(10) Patent No.: US 7,132,222 B2
(45) Date of Patent: Nov. 7, 2006

(54) MAGNETIC ETCHING PROCESS, ESPECIALLY FOR MAGNETIC OR MAGNETOOPTIC RECORDING

(75) Inventors: Claude Chappert, Garches (FR); Harry Bernas, Paris (FR); Jacques Ferre, Verrieres-le-Buisson (FR)

(73) Assignee: Centre National de la Recherche Scientifique (CNRS), Paris Cedex 16 (FR)

( * ) Notice: Subject to any disclaimer, the term of this patent is extended or adjusted under 35 U.S.C. 154(b) by 0 days.

(21) Appl. No.: 10/825,454

(22) Filed: Apr. 14, 2004

(65) Prior Publication Data

US 2004/0259036 A1    Dec. 23, 2004

Related U.S. Application Data

(63) Continuation of application No. 09/600,546, filed on Jul. 12, 2000, now abandoned, which is a continuation-in-part of application No. PCT/FR99/00043, filed on Jan. 12, 1999.

(30) Foreign Application Priority Data

Jan. 12, 1998    (FR) .................................. 98 00199

(51) Int. Cl.
*G03C 5/00* (2006.01)
*G11B 11/10* (2006.01)
*H01F 41/14* (2006.01)

(52) U.S. Cl. ...................... 430/311; 430/296; 430/320; 250/492.3; 250/492.2

(58) Field of Classification Search ..................... None
See application file for complete search history.

(56) References Cited

U.S. PATENT DOCUMENTS

| 4,551,908 | A | * | 11/1985 | Nagasawa et al. ............. 29/571 |
| 4,600,488 | A | * | 7/1986 | Imura et al. ................. 204/298 |
| 6,331,364 | B1 | * | 12/2001 | Baglin et al. ............ 428/694 T |
| 6,383,598 | B1 | * | 5/2002 | Fullerton et al. .......... 428/65.7 |
| 6,605,321 | B1 | * | 8/2003 | Ravelosona-Ramasitera et al. ........ 427/528 |

FOREIGN PATENT DOCUMENTS

| FR | 2773632 | * | 7/1999 |
| JP | 62-297458 | * | 12/1987 |
| JP | 0129688 | | 11/1989 |
| WO | 99/35657 | * | 7/1999 |

OTHER PUBLICATIONS

Terris, B.D., et al., "Ion Beam paterning og magnetic films using stancil masks", Appl. Phys. Lett., vol. 75(3). pp. 403-405. (Jul. 1999).*

Weller et al., Ino Induced Magnetization reorientation in Co/Pt multilayers for paterned media, J. Appl. Phys., vol. 87(9)pp. 5768-5770 (May 2000).*
Le Boite' M.G., et al., Study of ion beam mixed multilayers via neutron scattering., Mater. Lett., vol. 6(5,6) pp. 173-176 (Mar. 1988).*
Le Boite' M. G., et al., Characterization of in beam mixed multilayers via grazing x ray reflectometry, J. Mater. Res. vol. 3(6) pp. 1089-1096 (Nov./Dec. 1988).*
Traverse, A., et al., Quantitative Description of Mixing with light ions., Europhys. Lett., vol. 8(7) pp. 633-637 (Apr. 1989).*
Kanayama et al., "Fine Pattern Definition with Atomic Intermixing Induced by Focused Ion Beam and Its Application to X-ray Mask Fabrication", J. Vac Sci. Technol. B, vol. 9(2) pp. 296-301 (Apr. 1991).*
Jung et al. "Atomic Transport by Ion Beam Mixing in the Radiation Enhanced Diffusion Region", Mat. Res. Soc. Symp. Proc. vol. 354 pp. 21-26 (1995).*
Steckl et al. "Review of Focused ion beam mixing for the fabrication of GaAs based optoelectronic devices", J. Vac. Sci. Technol. B, vol. 13(6) pp. 2570-2575 (Nov./Dec. 1995).*
Gamo et al., "Recent advances in the Application of focussed ion beams", Mat. Res. Sco. Symp. Proc., vol. 45 pp. 223-234 (1985).*
Specification denoted WO 99/35657 in upper left and 1 in upper right.*
Specification denoted 2 in upper right hand corner.*
Ziao J Q. et al.: "Effects of ar-Ion implantation and annealing on structural and magnetic properties of CO/PD multilayers" Journal of applied Physics, vol. 76, No. 10, part 02 Nov. 15, 1994, pp. 6081-6083.
Amaral L. et al.: "Very Thin Fe/Ni modulation multilayer films under ion bombardment" Journal of Applied Physical vol. 81, No. 8, part 02B, Apr. 15, 1997, pp. 4773-4775.
Gladyszewski G. et al.: "Modification of Structure, Electric and Magnetic Properties of Epitaxially Grown Ag(001)/FE(001) Superlattices" Journal of Magnetism and Magnetic Materials, vol. 156, No. 1/03, Apr. 1, 1996, p. 381-382.
Choe G. et al.: "Effect of Ion Beam Mixing on Microstructure and Magnetic Properties of GD-Co Multilayer Films" Journal of Applied Physics, vol. 79, No. 8, part 02B, Apr. 16, 1996.
Schelp L. F. et al.: "Structural and Magnetic Behavior of AR+-Implanted Co/PD Multilayers: Interfacial Mixing" Journal of Applied Physics vol. 75, No. 10, part 01, May 15, 1994.

* cited by examiner

*Primary Examiner*—Martin Angebrandt
(74) *Attorney, Agent, or Firm*—Blakely Sokoloff Taylor & Zafman LLP

(57) ABSTRACT

Process for writing on a material, in which said material is irradiated by means of a beam of light ions, such as for example $He^+$ ions, said beam of light ions having an energy of the order of or less than a hundred keV, wherein this material comprises a plurality of superposed thin-layers, at least one of said thin layers being magnetic and in that one or more regions having sizes of the order of 1 micrometer or less are irradiated, the irradiation dose being controlled so as to be a few $10^{16}$ ions/$cm^2$ or less, the irradiation modifying the composition of atomic planes in the material at one or more interfaces between two layers of the latter.

15 Claims, No Drawings

MAGNETIC ETCHING PROCESS, ESPECIALLY FOR MAGNETIC OR MAGNETOOPTIC RECORDING

The present patent application is a Continuation of application Ser. No. 09/600,546, filed Jul. 12, 2000, now abandoned which is a continuation-in-part of International Application PCT/FR99/00043 filed Jan. 12, 1999.

The present invention relates to a magnetic etching process.

More particularly, the invention applies advantageously to ultrahigh-density magnetic recording (production of discrete magnetic materials, magnetic memory circuits, magnetically-controllable logic circuits, etc.), optical recording of the read-only memory type (CDROM, DVDROM, etc.) and production of magnetically-controllable optical circuits (diffraction gratings, photonic gap materials, etc.) using a controlled variation of the optical index component associated with the magnetism.

PRIOR ART

The extraordinary development of multimedia technologies and services in recent years has led to a race to increase the recording density. In the field of rewritable disks, although optical (phase change) technologies are developing rapidly, magnetic techniques remain the first choice, and most particularly the "hard disk", for its high transfer rate. However, the current magnetic techniques ought to be limited to storage densities of 100 bits/$\mu m^2$.

One of the limiting factors will especially be the transition to contact recording, for distances between the read head and the recording medium of less than 10 nm: there is a trend toward recording technologies of the "tunnel-effect microscopy" ("STM-like storage") or "near-field" type.

Several technological jumps have been proposed in this direction in recent years, for example near-field CD-ROM or near-field magnetooptic recording.

In this regard, reference may advantageously be made to the following various publications:

Y. Martin, S. Rishton, H. K. Wickramasinghe, Appl. Phys. Lett. 71, 1 (1997).

Y. Betzig, J. K. Trautman, T. D. Harris, J. S. Weiner, R. L. Kostelak, Science 251, 1468 (1991).

B. D. Terris, H. J. Mamin, D. Rugar, W. R. Studenmund, G. S. Kino, Appl. Phys. Lett. 65, 388 (1994).

E. Betzig et al., Appl. Phys. Lett. 61, 142 (1992).

M. Myamoto, J. Ushiyama, S. Hosaka, R. Imura, J. Magn. Soc. Jpn. 19-S1, 141 (1994).

T. J. Silva, S. Schultz, D. Weller, Appl. Phys. Lett. 65, 658 (1994).

M. W. J. Prinz, R. H. M. Groeneveld, D. L. Abraham, H. van Kempen, H. W. van Kesteren, Applied. Phys. Lett. 66, 1141 (1995).

Reference may also be made to the publication:

B. D. Terris H. J. Mamin, D. Rugar, Appl. Phys. Lett. 68, 141 (1996) in which it was announced that the company 3M would shortly be commercializing a magnetooptically-read "hard disk" using a solid immersion lens (SIL).

However, the main limitation of magnetic techniques should be the "paramagnetic limit", that is to say the size below which the bits will be erased by themselves due to a thermal effect.

In the current hard disk technology, the recording medium is a particulate material (magnetic particles in a nonmagnetic matrix, or magnetic particles (grains) separated by nonmagnetic grain boundaries (ME tape)). Now, minimization of the noise necessitates increasing the number of magnetic particles seen by the read head, while these particles must be magnetically decoupled as far as possible. The size of the particles is therefore very much less than the size of a bit. By extrapolating the current data, the particles would become paramagnetic below 8 nm, thereby limiting the recording density to around 100 bits/$\mu m^2$.

In magnetooptic recording, the materials used at the present time are amorphous alloys of the rare earth/transition metal type, which could be replaced with Co/Pt multilayers or alloys with the advent of the blue laser. Bits 60 nm in size could actually be written by a thermomagnetic effect in continuous Co/Pt multilayers, but it is probable that noise problems due to the recording medium (domain stability, domain wall roughness) would intervene, at bit sizes very much greater than 60 nm.

To extend this limit, it has recently been proposed to replace the current recording medium materials with discrete materials in which the magnetic bit limits would be geometrically defined by lithographic methods:

either deposition on an etched surface,

S. Gadetsky, J. K. Erwin, M. Mansuripur, J. Appl. Phys 79, 5687 (1996)

or growth of isolated magnetic particles whose size and position are defined by lithography, S. Y. Chou, M. S. Wei, P. R. Krauss, P. Fischer, J. Appl. Phys. 76, 6673 (1994).

The latter technique would allow there to be only a single magnetic particle per bit.

In parallel, pressing techniques based on a matrix defined by electronic lithography have been developed, S. Y. Chou, P. R. Krauss, P. J. Renstrom, Science 272, 85 (1996), Y. Xia, X. M. Zhao, G. M. Whitesides, Microelecton. Eng. 32, 255 (1996), which, just as in X-ray or interferential lithography, could in the near future allow mass production of etched media, with patterns very much less than one micron in size over areas of a few $cm^2$, probably sufficient for disks of the future.

However, in the current published work, these various techniques have several drawbacks:

1. Whatever the technique adopted, recording in contact mode will require a material having a low and controlled surface roughness: the etched materials proposed up until now will therefore require a final, and probably difficult, planarization step.

2. In the case of near-field magnetooptic recording, sudden variations in optical index (variations in reflectivity) of the etched material will give diffraction effects, which may be manifested by much greater polarization variations than those induced by the magnetic domains—a source of unacceptable noise.

3. A final problem, at very high densities on these etched materials, concerns the following of the track, and it will probably be necessary to develop a specialized "track" for this purpose, but without degrading the points mentioned above.

PRESENTATION OF THE INVENTION

The subject of the invention is a process for writing on a material, in which said material is irradiated by means of a beam of light ions (that is to say ions having a mass less than 16 units of atomic mass, such as for example $He^+$ ions), said beam of light ions having an energy of the order of or less than a hundred keV. This process is characterized in that this material comprises a plurality of superposed thin-layers, at least one of the thin layers being magnetic and in that one or more regions having sizes of the order of 1 micrometer or less are irradiated, the irradiation dose being controlled so as to be a few $10^{16}$ ions/cm$^2$ or less, the irradiation modifying the composition of atomic planes in the material at one or more interfaces between two layers of the latter. The magnetic properties of said material, such as, in particular, its coercivity, its magnetic anisotropy or its Curie temperature, are thus modified.

Typically, a thin layer presents a width of the order of 10 nm or less.

The superposed thin layers can advantageously be deposited on a substrate.

They can also be buried in a surface layer.

Such a process allows the aforementioned problems to be solved. In particular:

1. The roughness of the original film is unchanged by irradiation and can therefore be adjusted independently. In particular, it may be envisaged to carry out a postirradiation deposition (for the production of devices) under excellent growth conditions (% at an etched surface).

2. The optical index variations remain small for considerable changes in the magnetic properties and can, moreover, be controlled, within a certain range, almost independently of the magnetic variations obtained, by the structure of the substrate or the energy of the ions.

3. The effect of the irradiation is cumulative: it is possible to carry out the irradiation several times, and to obtain the same result as in a single time with the cumulative dose. This aspect may be useful when it is desired to irradiate several regions of the specimen with different values, or at different steps in the fabrication of a device.

4. The effect of the irradiation may be easily controlled in real time, by measuring the change in the properties (for example magnetic properties) over a test region.

5. The technique is easy to employ for the mass production of recording media, and to do so economically since the tools that it requires to be used are either already used in microelectronics (irradiation) or are under development (lithography by pressing in the case of large areas and of nanometric sizes, for example).

The irradiation may be carried out through a resin mask or with the aid of a focused ion beam.

The aforementioned etching process is advantageously used for the ultrahigh-density magnetic or magnetooptic recording of binary information, and especially for the production of discrete magnetic materials, of magnetic memory circuits or of magnetically-controllable logic circuits.

In particular, the aforementioned process has the advantage of making it possible to write magnetic domains of size very much less than 100 nm and whose position and geometry are perfectly defined and therefore to maximize the signal-to-noise ratio and optimize the track-following problems, while preserving perfectly controlled surface roughness.

In addition, the process proposed by the invention is advantageously used for producing an optical recording of the read-only memory type (CDROM, DVDROM, etc.).

It is known in fact that the near-field optical recording techniques will probably have to use smooth writing materials, with a read head flying a few nm above said material (at the present time, 30 nm for a hard disk). Now, the current optical recording techniques of the read-only memory type are not satisfactory: the pressing methods, using dies, may give sizes of less than 100 nm but the recording medium which is obtained is rough; as regards the writing methods using a focused laser beam (ablation, phase change), these do not make it possible to work with bit sizes of the order of or less than 100 nm.

Applications other than the recording of binary information may be envisaged. In particular, the magnetic etching process proposed by the invention is advantageously used for the production of magnetically-controllable optical circuits (diffraction gratings, photonic gap materials, etc.) using a controlled variation of the optical index component associated with the magnetism, for the production of sensors (hard disk read heads, etc.) or magnetic memory circuits (extraordinary Hall-effect memory, magnetoresistive memory, spin-dependent tunnel-effect memory).

In particular, it is known that the emergence of photonic gap materials opens the way to producing optical devices and that one of the aspects to be resolved will be that of control of the device. The process proposed by the invention makes it possible, by irradiation through a mask, to manufacture a waveguide film made of nonmagnetic material, comprising a regular array of magnetic units (photonic crystal) having an optical index which is both slightly different from that of the host material and magnetically controllable.

In general, the process proposed by the invention may apply whenever it is advantageous to define a magnetic element accurately, while maintaining a very high degree of planarity of the device (for example, in order to favor subsequent growth).

The process proposed by the invention may also be used for magnetically etching a layer already buried beneath other, insensitive layers, by adjusting the irradiation conditions. For example, and by way of nonlimiting indication, it is possible to produce electrical circuits etched in the same thin-film magnetic material, and only the important part of which will remain magnetic, the contact tracks having been made inactive by irradiation; the coercive field of a given region of a specimen may be controllably reduced so as to guarantee that the reversal of the magnetization will always occur under the same conditions, from the same site.

The process proposed by the invention may a priori be adapted to any material for which a minute variation in the local atomic arrangement can lead to a large modification in the magnetic properties, that is to say to transition metal alloys (e.g.: CoPt, NiFe, etc.), to rare earth/transition metal alloys (e.g.: TbFeCo, etc.) and to magnetic multilayers (e.g.: Co/Pt, Fe/Tb, etc.), without this list being exhaustive.

Co/Pt multilayers are materials which are potentially of interest for short-wavelength magnetooptic recording in blue light.

DESCRIPTION OF ONE OR MORE EMBODIMENTS

The process of magnetic etching by irradiation is described below in the case of magnetic multilayers irradiated by an ion beam and involves several steps, in which:

(i) the composition and the roughness at the interfaces and on the surface of the layers are carefully controlled before irradiation;

(ii) the multilayer structure is irradiated by a light-ion beam, the structural modification induced by the beam being controlled; in particular, the energy density deposited by the beam is controlled by choosing the mass and the energy of the incident ions;

(iii) the irradiation may be complemented by a suitable thermal processing in order to relax the stresses and/or induce local ordering.

In the case of magnetic materials, the effects of the process are important on alloys (transition metal alloys, rare earth alloys and rare earth/transition metal alloys) and on stacks of buried thin layers deposited on a substrate of all types.

The process is advantageously employed on Co/Pt multilayers. It should be noted that these materials have already been very widely studied for their properties, firstly their perpendicular magnetic anisotropy and secondly their strong magnetooptic Kerr effect; they therefore constitute advantageous candidates for magnetooptic recording.

In materials based on ultrathin multilayer films, the properties are dominated by the competition between the interface effects and the volume properties. For example, the easy magnetization direction is given by the sign of an effective anisotropy coefficient $K_{eff}$ which, to a first approximation, is given by:

$$K_{eff} = -K_d + K_v + \frac{(K_{s1} + K_{s2})}{t_{Co}}$$

The first term represents the dipole shape anisotropy ($K_d>0$), the second term represents the volume anisotropy ($K_v>0$ in the case of Co) and the last term is due to the interfaces ($K_s>0$ in the case of the Co/Pt interface), the influence of which varies inversely with the Co thickness $t_{Co}$ ($K_{s1}$ and $K_{s2}$ denoting the magnetic anisotropy coefficients of the two interfaces of the Co film. Depending on the sign of $K_{eff}$, the easy magnetization axis is either the axis perpendicular to the plane of the layers ($K_{eff}>0$) or the plane of the film. The perpendicular configuration is necessary for magnetooptic recording and will probably become the standard for ultrahigh-density magnetic recording, all techniques included.

The process is limited to irradiation resulting in low energy deposition (small number of atomic displacements at the interfaces that we are interested in). This may be achieved, for example, by light ions (e.g. He$^+$) of low energy (from a few keV to about a hundred keV). The irradiation firstly modifies the composition of the interface between two layers of material and therefore, in particular, the anisotropy. For the thinnest films (1 or 2 atomic planes) or for higher doses, the composition of the film and hence its volume magnetism are also modified (by transferring atoms from one layer to another): in the particular case of Co/Pt, the Curie temperature of the CoPt alloy decreases with Pt concentration, and becomes below room temperature at around 75% Pt.

For example, the inventors have rendered specimens, having a thickness $t_{Co}$ of 0.5 nm, paramagnetic at ordinary temperature, in a controlled manner, by irradiating, at a (very low) dose of $10^{16}$ ions/cm$^2$, with 30 keV He$^+$.

The effects of the irradiation were firstly characterized on simple Pt(3.4 nm)/Co($t_{Co}$)/Pt(6.5 nm)/amorphous substrate (Herasil polished silica, SiO$_2$/Si, Si$_3$N$_4$/Si) sandwiches deposited by sputtering.

With the deposition technique used, magnetic films with a perpendicular easy magnetization axis and a perfectly square polar hysteresis cycle (100% remanent magnetization) within the Co thickness range: 0.3–1.2 nm are obtained before irradiation.

The irradiation of these specimens at He$^+$ ion fluences up to around $2\times10^{15}$ atoms/cm$^2$, the ions being accelerated to energies of between 5 and 100 keV, makes it possible actually to adjust the magnetic properties of an ultrathin Co layer:

1. on 0.5 nm thick layers (approximately 2.25 atomic planes), the main effect is a drop in the Curie temperature, which may fall below room temperature for a dose of the order of $2\times10^{16}$ ions per cm$^2$. Below that, the film retains a perpendicular easy magnetization axis and a square loop, but the coercive field of which decreases uniformly when the irradiation dose is increased. Square magnetization loops with coercivities of a few Oe have been obtained. Advantageous applications for the production of low-field sensors may be envisaged;

2. on 1 nm thick specimens (approximately 5 atomic planes), the main effect of the irradiation is a tilt of the easy magnetization axis in the plane of the film, combined with a reduction in the interface anisotropy term $K_s$. The effect is obtained for low doses because the initial thickness is close to that (1.2 nm) at which the tilting effect occurs in the original specimens;

3. on specimens of intermediate thickness (0.8 nm, i.e. 4 atomic planes), the same doses have no visible effect on the hysteresis loop: at these thicknesses, the Curie temperature is already very high (close to that of bulk Co), and therefore largely insensitive to small modifications of the interface, these thicknesses also being very far from the natural thickness for tilting of the easy magnetization axis. This constitutes a useful characteristic of the process since it makes it possible, on the one hand, to irradiate a bilayer while modifying only one of the layers and, on the other hand, to work at much higher doses, more conducive to homogeneity.

It should be noted that the acceleration energy of the ions has a lesser effect on the modification of the magnetic properties than on the depthwise distribution of the level of displacements in the material. This may allow the process to be employed in thin layers buried at substantially greater depths than those used in the demonstration example.

An essential characteristic of the process proposed is that, although the effect of the irradiation on the magnetism is great, its effect on the optical reflectivity of the specimen remains small.

The contrast is invisible to the naked eye, and barely visible in a good microscope (contrast comparable to that of a domain wall in a Pt/Co/Pt specimen). The smallness of the optical effect is due to the smallness of the induced structural modifications.

Tests on (Pt/Co)$_6$/Pt multilayer stacks were also carried out. The structures of these multilayers (thicknesses, number of Co/Pt periods) were chosen around the values normally used for magnetooptic recording media. Compared with the simple picture of the variation in anisotropy with Co thickness, explained above in the case of the simple films, the effects of the irradiation on the magnetic properties are made more complex in multilayers by the magnetic interaction between the layers, which may be bipolar in origin, or an exchange interaction carried by the conduction electrons in the platinum. The latter interaction, which is actually manifested by ferromagnetism of the Pt for the interface layers, helps to raise the Curie temperature of the multilayers, especially when the Co thickness is very small. The presence of these two interactions also leads to the existence of quite a wide Co thickness range in which the system is decomposed into regular magnetic domains within which the magnetization is perpendicular ("strip" domain configuration), even for slightly negative $K_{eff}$ values where an easy magnetization plane would be expected.

The tests were carried out on two series of specimens, of the same Co thickness (and therefore the same single layer anisotropy) and the same number of periods, but differing in the thickness of the Pt separating layer:

A series: Pt(2 nm)/[Pt(1.4 nm)/Co(0.3 nm)]$_6$/Pt(6.5 nm)
B series: Pt(2 nm)/[Pt(0.6 nm)/Co(0.3 nm)]$_6$/Pt(6.5 nm)

In the case of the B series, the Pt concentration of the alloy after complete interdiffusion would be about 66% (ferromagnetic alloy) while it would be 82% for the A series (nonmagnetic alloy). On the other hand, in the B series, in which the Pt interlayer is thinner, the Co layers are more highly interacting, which in principle makes it easier to obtain the "strip" domain configuration, followed by the easy magnetization plane, by a reduction in the anisotropy.

Over the range of doses tested (up to $10^{16}$ He/cm$^2$ in the case of the A series and $2.6 \times 10^{16}$ He/cm$^2$ in the case of the B series), the irradiation results show qualitatively the same effects for both series: gradual (and easily controllable) transition from a perpendicular easy magnetization axis (with a perfectly square hysteresis loop whose coercive field decreases with the irradiation dose) to a "strip" domain configuration, and then to an easy magnetization plane. As explained above, this tilting takes place at a lower dose for the B series ($3 \times 10^{15}$ He/cm$^2$ as opposed to $6 \times 10^{15}$ He/cm$^2$). At the doses used, all the specimens remained ferromagnetic at room temperature.

In all the cases described above, no variation in the surface roughness of the specimen could be detected by AFM in air, even for extremely low, of the order of 0.2 nm rms, initial roughnesses.

Tests with irradiation through a resin mask were also carried out.

On Pt(3.4 nm)/Co(0.5 nm)/Pt(6.5 nm)/Herasil simple sandwich specimens, two types of resin were tested:

1. A Shipley negative resin, suitable for submicron lithography by X-ray lithography. The resin had been deposited as a thick (0.8 µm) layer over only half of a specimen and then annealed under the usual conditions. The entire specimen was then irradiated and the resin removed, again under the usual conditions (hot trichloroethylene bath).

The part unprotected by the resin reproduces the effects of the irradiation that were described above, whereas the protected part shows no change in its properties. In principle, using processes already developed elsewhere, the use of the same resin, but with in addition an X-ray lithography step in order to define an array of holes therein, should at the very least make it possible to obtain arrays of magnetically etched bits 0.2 µm in size separated by 0.2 µm, i.e. a recording density of 25 bits per µm$^2$, almost 20 times greater than the current densities;

2. a PMMA positive resin suitable for electron lithography. The resin was deposited as a layer about 0.85 µm in thickness and in this case was not annealed, something which might have an influence on the quality of the pattern edges. Under the standard annealing conditions for this resin (160° C., 30 min) effects start to appear in the specimens, but annealing of just as good quality is possible at lower temperatures (<120° C.), at which the specimens are insensitive). Next, the specimens underwent an electron lithography step in order to define, as recesses in the resin, an array of lines 1 µm in width, separated by 1 µm, over an area of 800×800 µm$^2$. The entire specimen was then irradiated and the resin removed under the standard conditions. Observation in a magnetooptic microscope shows that, at the chosen irradiation dose ($10^{16}$ He/cm$^2$), the irradiated part becomes paramagnetic at room temperature (this state has the advantage of eliminating the coupling between magnetic regions).

The part protected by the resin remains magnetized perpendicularly, with a square loop similar to that of the original specimen.

The same electron lithography process as above was applied to a Pt(2 nm)/[Pt(0.6 nm)/Co(0.3 nm)]$_6$/Pt(6.5 nm) multilayer of the B series in order to create the same array of lines, followed by an irradiation at a dose of $2 \times 10^{15}$ He/cm$^2$. However, unlike in the case of the single 0.5 nm Co layer, the two parts (the protected part and the irradiated part) retain a perpendicular magnetization and a square loop with, however, a lower coercive field in the case of the irradiated part. In fact, observation in a magnetooptic microscope clearly shows a reversal of the magnetization in the reverse applied field after saturation, which firstly takes place in the irradiated lines and then propagates into the unirradiated parts (lines and film outside the array). In the intermediate region, magnetic domains artificially created by lithography are therefore obtained. Next, tests were carried out using near-field magnetooptic microscopy, which made it possible to see these artificial domains very precisely. This consequently demonstrates the feasibility of the proposed "contact" recording process. On the other hand, on specimens that were similar but were etched by material ablation, the same near-field microscopy technique reveals only the diffraction effects.

It should be noted that, after irradiation, the PMMA resin becomes more difficult to remove. Residues remaining along the features introduce roughness and a weak optical contrast of nonmagnetic origin, something which requires an additional stripping procedure in an "oxygen plasma" (a procedure well known in microtechnologies).

Finally, the precision of PMMA-resin electron lithography gives rise to the hope that it will be possible to achieve bit sizes of less than 100 nm, i.e. a density greater than 100 bits/µm$^2$.

A series of similar experiments, using masks made of silica and irradiated with He ions under the same conditions as above, has allowed the inventors to expect a resolution (deduced from magnetooptic measurements) of 30 nm on lithographically etched lines.

The techniques of the type that have just been described are advantageously used for manufacturing films which include buried magnetic structures, especially for the production of magnetically structured recording media or of magnetoelectronic devices, such as M-RAM memories, logic devices, etc.

They allow planar magnetic etching of buried magnetic layers, which does not modify the surface roughness of the material and makes it possible to control the variations in optical properties, for example to make them negligible.

These techniques can be used for mass production on an industrial scale.

Using light ions, which have no etching effect, these can be deeply implanted into the substrate, well below the magnetic layer.

The parameter is then the energy deposited per ion along the trajectory—and not the cascades of defects generated by heavy ions—thereby allowing excellent control of the electromagnetic modifications, for high doses, something which gives a homogeneous effect.

Moreover, an easy nucleation region, due to the reversal of the magnetization) and associated with phenomena occurring at the border of the irradiated region, is intrinsically obtained with the proposed technique. This is a major advantage for controlling and standardizing the magnetization reversal field in an assembly of magnetic "particles", either for a recording medium material or for a memory or logic chip, without limitation.

It should be noted that contrary to heavy ions irradiation techniques in which the atomic modifications are obtained due to the succession chain of defaults created by the heavy ions, the light ions irradiation technique which is herewith presented permits a high control of the magnetic modifications and, for the high irradiation doses, permits to obtain an homogeneous effect.

This is due
(i) to the low density of the atomic moves due to the collisions with the atoms at tthe interface of the thin layers
(ii) to the low energy transferred during these collisions.

The invention claimed is:

1. A writing process for forming a pattern on a multi-layer material composed of thin layers deposited on a substrate, in which said multi-layer material is irradiated by means of a beam of light ions, having an energy of the order of or less than a hundred keV, wherein one or more regions of the multi-layer material having individual sizes of the order of 1 micrometer or less are selectively irradiated, the irradiation dose being controlled so as to be a few $10^{16}$ ions/cm$^2$ or less, the irradiation modifying the composition of atomic planes in the material around an interface between two layers of the multi-layer material, wherein said light ions are ions having a mass less than 16 units of atomic mass.

2. Process according to claim 1, wherein the irradiation is carried out through a mask.

3. Process according to claim 2, wherein the writing process is adapted for the magnetic or magnetooptic recording of binary information, for the production of discrete magnetic materials, of magnetic memory circuits or of magnetically-controllable logic circuits, or for the production of sensors.

4. Process according to claim 2, wherein the writing process is adapted for optical recording process of a read-only memory type.

5. Process according to claim 2, wherein the writing process is adapted for producing magnetically-controllable optical circuits using a controlled variation of the optical index component associated with magnetism.

6. Process according to claim 1, wherein the writing process is adapted for the magnetic or magnetooptic recording of binary information, for the production of discrete magnetic materials, of magnetic memory circuits or of magnetically-controllable logic circuits, or for the production of sensors.

7. Process according to claim 1, wherein the writing process is adapted for optical recording process of a read-only memory type.

8. Process according claim 1, wherein the recording material is a magnetic multi-layer material, the individual layers of which are pure metals or transition metal alloys or rare earth alloys.

9. Process according to claim 1, wherein the writing process is adapted for producing magnetically-controllable optical circuits using a controlled variation of the optical index component associated with magnetism.

10. Process according to claim 1, wherein the beam of light ions comprises $He^+$ ions.

11. Process according to claim 1, wherein said irradiation is capable of modifying the composition around said interface between two layers without measurably increasing the surface roughness of the multi-layer material.

12. A process for performing irradiation on a multi-layer material having a buried layer disposed between at least one top layer and at least one bottom layer, said process comprising:
   selecting one or more regions of the multi-layer material having a width in the order of 1 micrometer or less; and
   irradiating the selected regions of the multi-layer material with (1) a beam of light ions having an energy of the order of or less than a hundred keV and (2) irradiation dose controlled so as to be a few $10^{16}$ ions/cm$^2$ or less such that the irradiation modifies the buried layer of the multi-layer material, wherein said light ions are ions having a mass less than 16 units of atomic mass.

13. Process according to claim 12, wherein the irradiation modifies a magnetic property of the buried layer.

14. Process according to claim 12, wherein the irradiation is capable of modifying the buried layer of the multi-layer material without significantly affecting the optical reflectivity of the at least one top layer of the multi-layer material.

15. Process according to claim 12, wherein said irradiation is capable of modifying the magnetic property of the buried layer without measurably increasing the surface roughness of the multi-layer material.

* * * * *

UNITED STATES PATENT AND TRADEMARK OFFICE
CERTIFICATE OF CORRECTION

PATENT NO.         : 7,132,222 B2                                          Page 1 of 1
APPLICATION NO. : 10/825454
DATED              : November 7, 2006
INVENTOR(S)        : Claude Chappert, Harry Bernas and Jacques Ferre It is certified that error appears in the above-identified patent and that said Letters Patent is hereby corrected as shown below:

On Page 1, column 2, under other publications, please delete "Ziao" and insert -- Xiao --.

Signed and Sealed this

Fourth Day of August, 2009

JOHN DOLL
*Acting Director of the United States Patent and Trademark Office*